Patented Mar. 26, 1935

1,996,035

UNITED STATES PATENT OFFICE 1,996,035

MINERAL CONCENTRATION

James T. Singleton, Pierce, Fla., assignor to The American Agricultural Chemical Company, Newark, N. J., a corporation of Delaware No Drawing. Application September 21, 1931, Serial No. 564,251. Renewed August 18, 1934

4 Claims. (Cl. 209—49)

This invention relates to mineral concentration, and more particularly to the concentration of phosphate-bearing materials, such for instance, as apatite, phosphorite, and natural or artical materials comprising mixtures of sand or the like with tri-calcium phosphate or other insoluble phosphates.

A desirable concentration process of the class described may, for example, include the steps of mixing the phosphate-bearing material, conveniently in the form of a pulp or in an equivalent finely divided state, with a concentrating agent, and of then feeding the mixture to suitable concentration apparatus, such as a table, flotation cell or the like, for separating operation thereof in a manner which will be understood. Among the criteria of such processes are economy in the use of concentrating agents and other substances used to promote concentration, and corresponding efficiency in effecting separation of a phosphate bearing concentrate having a high percentage of the desired phosphatic constituent, and/or comprising a large part of the latter material originally present in the ore. It may here be noted that among others, a common example of such desired constituent is bone phosphate of lime (commonly abbrebiated "B. P. L.").

It has now been found that in addition to the use of a concentrating agent to wet one of the constituents of the phosphate rock, for purposes of separating it from another constituent, the separation may be rendered more effective, in the respects stated, by appropriate treatment of the materials with a cooperating agent of suitable composition. To that end, an important feature of the present invention is directed to the provision and use, in the concentration of phosphate bearing materials, of such an agent or material, adapted to be mixed with the phosphate rock or the like so as to "condition" it for better concentration and notably for more advantageous operation of the concentrating or wetting agent. Not only is it thus an object of the invention to provide such material or composition, but it is a further object to provide a conditioning agent which is notably inexpensive and which will be highly efficacious in processes of the nature stated.

With these ends in view and such others as will be hereinafter apparent or incidental to the practice of the invention, the new concentration-promoting or conditioning agent which has now been found comprises a material of the sort conveniently styled lime-sulfur. This material, which may advantageously be used in a dilute solution for treating the phosphate-bearing material as suggested hereinabove, comprises a composition including calcium and sulfur in combined form, and its nature is understood to be that of one or more sulfides of calcium, commonly comprising one or more poly-sulfides, whereby it may be represented by the generalized formula $CaS_x$. A notably desirable form of such material may be readily prepared, in the convenient state of a solution, by mixing sulfur with lime and water. Useful solutions have thus been made up by mixing ten parts, by weight, of lime, 7 parts of sulfur, and 350 parts of water, although, as will be understood, other proportions may be followed; it has been found, for example, that stronger solutions may be satisfactory for the purposes described.

In carrying out a concentration process embodying the present invention, the phosphatic pulp or like material may be mixed with the lime-sulfur solution, as a preliminary step if desired, and the conditioned pulp then mixed with the concentrating agent and other co-operating substances, the final mixture being subsequently fed to suitable concentration apparatus, such as a Wilfley table or a standard flotation cell, for actual separating operation. A suitable Wilfley table is shown, for example, in R. H. Richards and C. E. Locke, "Text Book of Ore Dressing" (McGraw-Hill Book Co., New York, 1925), at pages 207–213. Among other concentrating agents, the operation of which is rendered more satisfactory by the use of the conditioner herein described, there may be mentioned bone-oil, (in crude form or "treated" with a suitable alkali), and substances of the nature of sulfonated oils, including Turkey red oil, sulfonated petroleum oil and so forth. As will be understood, other suitable oils or materials may be used in conjunction with the concentrating agent, such co-operating oils including fuel oil, distillate, lubricating oil, other petroleum oils, and the like.

The conditioning operation of the lime-sulfur serves in an advantageous manner to render the action of the concentrating agent more specific and to effect economy in use of the latter, and has the further desirable result, for example, of increasing the yield of desired phosphatic constituent in the final concentrate, in all respects. The action of the conditioner, rather than being of the nature of sulfurization of the ore, is characetrized by an alteration of the surface of the phosphate whereby the concentrating agent is enabled to function more advantageously. It is believed that there is no substantial change of the ore into sulfide, inasmuch as relatively small quantities of the lime-sulfur may be used with satisfactory results, and the final result is phosphatic and not of the nature of a sulfide. The general effect of using the conditioner is to facilitate greatly the separation of the phosphate from the sand or other silicious material.

The following specific example of the use of the new conditioner may serve to illustrate the invention, in a manner clear to those skilled in the art:

595 parts by weight of phosphate rock debris of 20-mesh fineness were mixed with three parts of lime-sulfur solution, two parts of treated bone-oil and enough water to wet the mixture. The latter was then tabled, and yielded a concentrate which tested 75.6 per cent B. P. L. and comprised a recovery of 91 per cent of the original phosphate. The phosphate rock here used was Florida phosphate, which contains approximately 50 per cent B. P. L., it being understood, however, that the invention is suitable for use in the concentration of any phosphate pulp. It may also be noted that in the example described the lime-sulfur solution was conveniently characterized by a strength of 16 per cent by weight.

In the pending application of Johnson Hagood, Serial No. 564,253, filed September 21, 1931, the process of treating phosphatic pulp with a basic soluble sulfide and with a sulfonated oil as a conditioner is being claimed broadly, and in the pending application of Simon Klosky, Serial No. 564,252, filed September 21, 1931, the process of treating phosphatic pulp with a basic soluble sulfide and with bone-oil as a concentrating agent is being claimed broadly.

It is to be understood that the invention is not limited to the specific compositions and procedure herein described but can be carried out in other ways without departure from its spirit as defined by the following claims.

I claim:

1. In the art of concentrating phosphatic material in the form of a pulp to separate phosphatic from other constituents, the improvement which comprises treating the phosphatic pulp with a conditioner including lime-sulfur, mixing the treated pulp with a phosphate wetting reagent selected from the class consisting of bone-oil and the sulfonated oils, and thereafter subjecting the mixture to non-aerating gravitative separation and recovering a phosphate-bearing concentrate.

2. In the art of concentrating phosphatic material in the form of a pulp to separate phosphatic from other constituents, the improvement which comprises mixing the phosphatic pulp with lime-sulfur solution and with bone-oil as a concentrating agent, and thereafter subjecting the mixture to the concentrating operation and recovering a phosphate-bearing concentrate.

3. In a process of concentrating phosphatic material in which a phosphate-bearing concentrate is recovered by substantially soap-free concentrating operation to separate phosphatic from other constituents, the procedure which includes mixing the phosphatic pulp with lime-sulfur and a concentrating agent, substantially free of soap, selected from the class consisting of bone-oil and the sulfonated oils.

4. In a process of concentrating phosphatic material in which a phosphate-bearing concentrate is recovered by concentrating operation to separate phosphatic from other constituents, the procedure which includes mixing the phosphatic pulp with lime-sulfur solution and with bone-oil as a concentrating agent.

JAMES T. SINGLETON.